United States Patent
Huang et al.

(10) Patent No.: US 12,217,014 B2
(45) Date of Patent: Feb. 4, 2025

(54) METHOD, APPARATUS, AND SYSTEM FOR PROVIDING INTERPRETATION RESULT USING VISUAL INFORMATION

(71) Applicant: Electronics and Telecommunications Research Institute, Daejeon (KR)

(72) Inventors: Jinxia Huang, Daejeon (KR); Jong Hun Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 484 days.

(21) Appl. No.: 17/570,879

(22) Filed: Jan. 7, 2022

(65) Prior Publication Data
US 2022/0222448 A1    Jul. 14, 2022

(30) Foreign Application Priority Data

Jan. 8, 2021    (KR) .................. 10-2021-0002716

(51) Int. Cl.
*G06F 40/58*    (2020.01)
*G06F 3/01*    (2006.01)
(Continued)

(52) U.S. Cl.
CPC ............. *G06F 40/58* (2020.01); *G06F 3/013* (2013.01); *G06T 7/11* (2017.01); *G06V 20/63* (2022.01);
(Continued)

(58) Field of Classification Search
None
See application file for complete search history.

(56) References Cited

U.S. PATENT DOCUMENTS 9,076,033 B1 *   7/2015  Barron ................. G06F 3/005
9,495,589 B2    11/2016  Strombom et al.
(Continued)

FOREIGN PATENT DOCUMENTS

| CN | 104899192 | 9/2015 |
|----|-----------|--------|
| KR | 10-1564387 | 11/2015 |

(Continued)

OTHER PUBLICATIONS

Toyama, Takumi, et al. "A mixed reality head-mounted text translation system using eye gaze input." Proceedings of the 19th international conference on Intelligent User Interfaces. 2014. (Year: 2014).*

(Continued)

*Primary Examiner* — Andrae S Allison
(74) *Attorney, Agent, or Firm* — KILE PARK REED & HOUTTEMAN PLLC (57) ABSTRACT

Provided is a method of providing an interpretation result using visual information, and the method includes: acquiring a spatial domain image including line-of-sight information of a user and gaze position information in the spatial domain image; segmenting the acquired spatial domain image into a plurality of images; detecting text areas including text for each of the segmented images; generating text blocks, each of which is a text recognition result for each of the detected text areas, and determining the text block corresponding to the gaze position information; converting a first language included in the determined text block into a second language that is a target language; and providing the user with a conversion result of the second language.

16 Claims, 5 Drawing Sheets

(51) Int. Cl.
*G06T 7/11* (2017.01)
*G06V 20/62* (2022.01)
*G06V 30/14* (2022.01)
*G06V 40/20* (2022.01)

(52) U.S. Cl.
CPC .......... *G06V 30/1444* (2022.01); *G06V 40/20* (2022.01); *G06T 2207/20021* (2013.01)

(56) References Cited

U.S. PATENT DOCUMENTS

| | | | |
|---|---|---|---|
| 9,696,800 B2 | 7/2017 | Yoon | |
| 9,779,299 B2 | 10/2017 | Strombom et al. | |
| 10,346,128 B2 | 7/2019 | Vennström et al. | |
| 2013/0346060 A1 | 12/2013 | Shin et al. | |
| 2014/0225918 A1* | 8/2014 | Mittal | G06T 19/006 345/633 |
| 2014/0368532 A1* | 12/2014 | Keane | G06F 3/04815 345/619 |
| 2015/0293586 A1* | 10/2015 | Kritt | G06F 3/013 345/158 |
| 2017/0186230 A1* | 6/2017 | Ivers | G06F 3/04842 |
| 2017/0200296 A1* | 7/2017 | Jones | G09G 5/02 |
| 2017/0318019 A1* | 11/2017 | Gordon | G06V 40/67 |
| 2018/0075659 A1* | 3/2018 | Browy | G06F 3/011 |
| 2018/0114366 A1* | 4/2018 | Ivers | G06T 11/00 |
| 2019/0227694 A1* | 7/2019 | Shin | G06F 3/017 |

FOREIGN PATENT DOCUMENTS

| | | |
|---|---|---|
| KR | 10-1619635 | 5/2016 |
| KR | 10-2018-0087961 | 8/2018 |
| KR | 2019-0089627 | 7/2019 |
| KR | 10-2113393 | 5/2020 |
| WO | 2015/034560 | 3/2015 |

OTHER PUBLICATIONS

Rzayev et al, E!ects of Position of Real-Time Translation on AR Glasses, Proceedings of the Conference on Mensch und Computer (MuC '20), Sep. 6-9, 2020, Magdeburg, Germany (Year: 2020).*
de Tróia Salvado, Ana Rita. "Augmented reality applied to language translation." Universidade Nova de Lisboa (2015). (Year: 2015).*
Gambier et al, Rapid and Radical Changes in Translation and Translation Studies, International Journal of Communication 10(2016), 887-906 (Year: 2016).*
Rongbo Wang and Zheru Chi, "Automatic segmentation of Chinese chunks using a neural network," International Conference on Neural Networks and Signal Processing, 2003. Proceedings of the 2003, Nanjing, 2003, pp. 96-99 (Year: 2003).*
Zoya Bylinskii, et al., "Where should saliency models look next?", Computer Science and Artificial Intelligence Laboratory Massachusetts Institute of Technology, Oct. 11-14, 2016.
Han Lin, "Review of Scene Text Detection and Recognition", Archives of Computational Methods in Engineering, Feb. 27, 2020.
Dzmitry Bahdanau et al.; "Neural Machine Translation by Jointly Learning to Align and Translate"; ICLR, 2015; arXiv:1409.0473v7 [cs.CL] May 19, 2016.
Jonathan Long et al.; "Fully Convolutional Networks for Semantic Segmentation"; arXiv:1411.4038v2 [cs.CV] Mar. 8, 2015; IEEE, pp. 3431-3440, 2015.
Ashish Vaswani et al.; "Attention Is All You Need"; 31st Conference on Neural Information Processing Systems (NIPS, 2017); arXiv:1706. 03762v5 [cs.CL], Dec. 6, 2017.
Liang-Chieh Chen et al., "DeepLab: Semantic Image Segmentation with Deep Convolutional Nets, Atrous Convolution, and Fully Connected CRFs"; arXiv:1606.00915v2 [cs.CV] May 12, 2017; IEEE, vol. 40, Apr. 2018.

* cited by examiner

METHOD, APPARATUS, AND SYSTEM FOR PROVIDING INTERPRETATION RESULT USING VISUAL INFORMATION

CROSS-REFERENCE TO RELATED APPLICATION

This application claims priority to and the benefit of Korean Patent Application No. 10-2021-0002716, filed on Jan. 8, 2021, the disclosure of which is incorporated herein by reference in its entirety.

BACKGROUND

1. Field of the Invention

The present invention relates to a method, apparatus, and system for providing an interpretation result using visual information.

2. Discussion of Related Art

Recently, with development of various visual devices in the performance, visual devices are combined with interpretation or translation systems and utilized.

However, in the related art, since the visual device blocks the field of view of a user, the use of the visual device has limitations, or the usability of the visual device is limited according to the external environment or the state of use.

In order to compensate for the constraint, utilizing a user's feedback using auditory or tactile sense may be considered, but in this case, resulting partial errors or inappropriate feedback may cause an adverse reaction.

RELATED ART DOCUMENTS

Patent Document

Korean Laid-open Patent Publication No. 10-2018-0087961 (Aug. 3, 2018)

SUMMARY OF THE INVENTION

The present invention is directed to providing a method, apparatus, and system for providing an interpretation result using visual information that are capable of recognizing text at a gaze position that a user gazes at, converting the text corresponding to the gaze position into a target language, and providing the user with the converted result in an auditory form.

The technical objectives of the present invention are not limited to the above, and other objectives may become apparent to those of ordinary skill in the art based on the following description.

According to the first aspect of the present invention, there is provided a method of providing an interpretation result using visual information, which is performed by an apparatus for providing an interpretation result using visual information, the method including: acquiring a spatial domain image including line-of-sight information of a user and gaze position information in the spatial domain image; segmenting the acquired spatial domain image into a plurality of images; detecting text areas including text for each of the segmented images; generating text blocks, each of which is a text recognition result for each of the detected text areas, and determining the text block corresponding to the gaze position information; converting a first language included in the determined text block into a second language that is a target language; and providing the user with a conversion result of the second language.

According to the second aspect of the present invention, there is provided an apparatus for providing an interpretation result using visual information, the apparatus including: a visual information receiver configured to acquire a spatial domain image including line-of-sight information of a user and gaze position information in the spatial domain image; a visual information converter configured to segment the acquired spatial domain image into a plurality of images, detect text areas including text for each of the segmented images, determine, among text blocks, each of which is a text recognition result for each of the detected text areas, a text block corresponding to the gaze position information, and convert a first language included in the determined text block into a second language that is a target language; and an interpretation result provider configured to provide the user with a conversion result of the second language.

According to the third aspect of the present invention, there is provided a system for providing an interpretation result using visual information, the system including: a communication module configured to acquire a spatial domain image including line-of-sight information of a user and gaze position information in the spatial domain image from an external device; a memory in which a program for recognizing text on the basis of the spatial domain image and the gaze position information and provide an interpretation result for the recognized text is stored; and a processor configured to execute the program stored in the memory to: segment the acquired spatial domain image into a plurality of images; detect text areas including text for each of the segmented images; determine, among text blocks, each of which is a text recognition result for each of the detected text areas, a text block corresponding to the gaze position information; and convert a first language included in the determined text block into a second language that is a target language.

According to another aspect of the present invention, there is provided a computer program that executes the method of providing an interpretation result using visual information in combination with hardware and is stored in a recording medium.

Other specific details of the present invention are included in the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims.

Terms used herein are used for aiding in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used for designating the same elements throughout the specification, and the term "and/or" includes any one or combinations of the associated listed items. It should be understood that, although the terms "first," "second," etc. may be used herein to describe various elements, these elements are not limited by these terms. These terms are only used for distinguishing one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly specifically defined herein.

The present invention relates to a method, apparatus, and system for providing an interpretation result using visual information.

The present invention is provided to convert a character string, a sentence, and text delivered in a visual form into a target language (hereinafter referred to as a second language) different from a language (hereinafter referred to as a first language) having been used for expression of the character string, sentence, and text.

The present invention is provided to interpret text on which a user focuses into a speech of a target language of the user using various eye tracking devices, such as a head-mounted type eye tracking device, a goggles type eye tracking device, and a glasses type eye tracking device.

In order to construct an embodiment of the present invention, a plurality of techniques are partially used in combination.

First, the present invention uses a gaze position recognition technology for generating a spatial domain image including line-of-sight information of a user and gaze position information corresponding to the line-of-sight information of the user in the spatial domain image.

Second, the present invention uses an image segmentation technology to acquire a section of an object or text in the spatial domain image.

Third, the present invention uses an optical character recognition (OCR) technology that converts a text image within the acquired text section into text.

Fourth, the present invention uses a machine translation technology for converting text data expressed in a first language into a second language.

Finally, the present invention uses a text-to-speech (TTS) technology or speech synthesis technology that converts the converted text of the second language into a speech signal.

Each of the technologies has been independently improved by experts in the relevant field. In particular, in the case of gaze position recognition technology, there are known technologies implemented in the form of industrial products, including wearable device forms, and in the case of OCR, machine translation, and speech synthesis technologies, there are known technologies implemented in the form of individual software and web services.

Inventions combining some of the related arts have also been known through newspapers and broadcast media through augmented reality (AR) application software forms, such as Word Lens (Otavio Good and 4 others, 2010).

Embodiments of the present invention are conceived to overcome limitations that may occur when the above technologies are simply combined. The limitations are as follows:

First, a method of providing a spatial domain image acquired through an external camera and a translation result overlaid on the corresponding image generally requires a wearable screen output device, such as a head mounted display (HMD). Since the devices partially or completely block the user's view, there are limitations in use at outdoor activities, so the devices need to be used in a limited area such as indoors.

Such a limitation results in lower usability because a situation in which there is a need to convert a first language into a second language does not occur only in a limited area. In addition, the limitation is deeply related to an additional limitation of inability to transmit visual feedback to a user suffering from a visual impairment.

Second, gaze recognition technology may incur limitations in use for a specific user and use environment, such as a user suffering from ocular motor dysfunction or a usage environment, such as disturbance of infrared (IR) sensors (e.g., outdoor environments exposed to strong sunlight).

The above two limitations are limitations caused by device characteristics, and as an alternative to overcome the limitations, providing non-visual user feedback may be considered.

Non-visual user feedback refers to using a sense of hearing and touch that may implement common symbolic representation (symbols and sequences that may contain implicit meanings, such as words and letters) among the five senses that humans may perceive. In this case, the sense of touch is used based on a considerable period of training to recognize symbolic representation, such as text, and thus is difficult to apply. Accordingly, a need to give user feedback through a method, such as by hearing, arises.

However, when using user feedback through the sense of hearing or the like, a subsidiary issue additionally occurs. That is, the third and final limitation is a dependent problem that appears in the process of resolving the two limitations, and may involve partial errors and inappropriate user feedback that may occur due to using gaze recognition technology and non-visual user feedback even though detailed text in a spatial domain image including the line-of sight of a user may include a separate meaning according to the section (e.g., street signs, menu boards, etc.), which may cause irreparable harm to users.

Therefore, a need for a method capable of solving the subsidiary issue occurring while using the auditory feedback arises.

An embodiment of the present invention aims to solve the problems caused by combination of the related arts and, rather than converting visual information expressed in a first language into visual information expressed in a second language, convert visual information expressed in a first language into auditory user feedback expressed in a second language and deliver the auditory user feedback to the user.

In addition, an embodiment of the present invention aims to reduce errors that may occur in the conversion process and provide user convenience equivalent to using visual feedback while using auditory feedback.

Hereinafter, an apparatus 100 for providing an interpretation result using visual information according to an embodiment of the present invention will be described with reference to FIGS. 1 to 2D.

Figure 1:
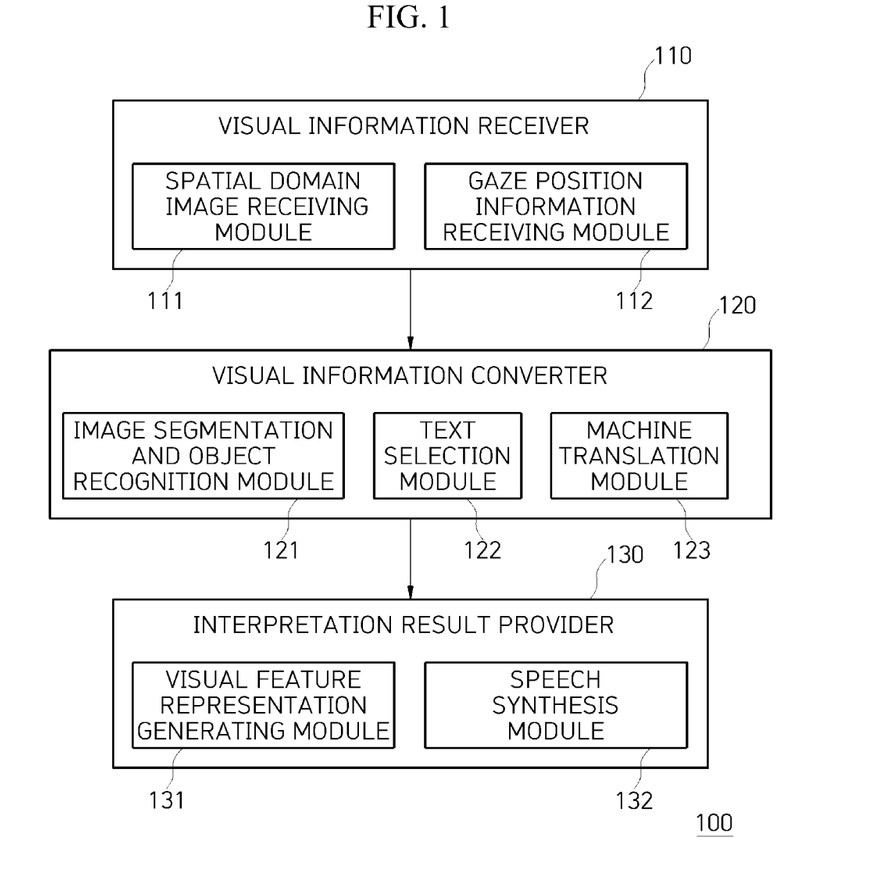
FIG. 1 is a diagram for describing an apparatus for providing an interpretation result according to an embodiment of the present invention.

FIG. 1 is a diagram for describing an apparatus 100 for providing an interpretation result according to an embodiment of the present invention.

The apparatus 100 for providing an interpretation result according to the embodiment of the present invention includes a visual information receiver 110, a visual information converter 120, and an interpretation result provider 130.

First, the visual information receiver 110 acquires a spatial domain image including line-of-sight information of a user and gaze position information in the spatial domain image from an external device. Here, the gaze position information is acquired through a result of a pupil position sensor and may include a gaze position and maintenance time information of the gaze position.

An embodiment of the present invention may utilize various conventional technologies to acquire the spatial domain image including line-of-sight information of the user and the gaze position in the spatial domain image from an external device.

As a representative example of the related art for acquiring mixed information of a spatial domain image and a gaze position, there is disclosed Korean Registered Patent No. 10-1564387 (Title of the Invention: Detection of the gaze position supported by an optical reference signal), and the like.

In addition to the patent, the acquisition of a spatial domain image and gaze position information may be achieved through an apparatus including at least three elements which are an infrared (IR) sensor for recognizing the position of a pupil by acquiring the contour of the pupil, a camera for acquiring a spatial domain in which the line of sight of the user is located, and a wired or wireless communication module for transmitting results and information acquired through the two sensors and devices to a computer or another main processing device or module capable of processing the results and information.

Meanwhile, the visual information receiver 110 may include a spatial domain image receiving module 111 for receiving a spatial domain image, and a gaze position information receiving module 112 for receiving gaze position information.

Such a spatial domain image and gaze position information corresponding thereto are arranged based on time and transmitted to the visual information converter 120 to be described below. For example, the visual information receiver 110 may use a real time clock to recognize the time at which the spatial domain image and the gaze position information are received and arrange the spatial domain image and the gaze position information, and store the information using a main memory (a random access memory (RAM)).

The visual information converter 120 may allow processing modules 121, 122, and 123 that operate based on a central processing unit (CPU) and a memory device (including both of a volatile memory, such as RAM, and a nonvolatile memory, such as NAND/Electrically Erasable Programmable read-only memory (EEPROM), etc.) to convert visual information transmitted from the visual information receiver 110 into text or another symbolic information form.

The visual information converter 120 includes an image segmentation and object recognition module 121 based on a neural network, a text selection module 122, and a machine translation module 123.

The image segmentation and object recognition module 121 first receives a spatial domain image transmitted from the spatial domain image receiving module 111 and segments the spatial domain image into a plurality of images.

The image segmentation and object recognition module 121 may segment the acquired spatial domain image into a plurality of images based on a pre-trained neural network algorithm and determine, for each of the segmented images, an individual object corresponding to one of previously-specified classes. The image segmentation and object recognition module 121 detects a text area including text for each of the segmented images.

The image segmentation and object recognition module 121 is implemented through a single neural network model or multiple neural network models for image segmentation and visual object detection, which corresponds to a process referred to as a semantic image segmentation process.

Detailed methods of implementing such a neural network include examples of a fully convolutional network (FCN) (Long, J et al., "Fully Convolutional Networks for Semantic Segmentation", in CVPR2015) or DeepLab (Chen et el., "DeepLab: Semantic Image Segmentation with Deep Convolutional Nets, Atrous Convolution and Fully Connected CRFs", in TPAMI2017) neural network models.

The segmented image and the object recognition results from the image segmentation and object recognition module 121 are transmitted to the text selection module 122 and a visual feature representation generating module 131 to be described below.

The text selection module 122 combines the text area detected by the image segmentation and object recognition module 121 with the gaze position information received from the gaze position information receiving module 112 to select text at which the user currently gazes.

Specifically, the text selection module 122 generates text blocks, each of which is a text recognition result for each of the detected text areas, and determines a text block corresponding to the gaze position information among the generated text blocks.

In one embodiment, the text selection module 122 may combine text blocks consecutively located within predetermined adjacent sections into one text block, separate text blocks having a different size or font while being located in the same or adjacent text areas, and assign a unique number (unique identification (ID)) to the text block or the combined text block. That is, the text selection module 122 defines regions of text expressed as a visual image to combine pieces of text expressed in continuous image section blocks in sections adjacent to each other into one text and assign a unique ID to each region.

In addition, the text selection module 122, in order to track a change that occurs due to a person's head turning, movement, etc. over time, when there is a unique ID assigned in previous visual information, remembers a text block with the unique ID assigned in the previous visual information for a certain period of time as the same text block according to the size and shape of the text block corresponding to the unique ID assigned in the previous visual information.

The text selection module 122 may recognize text for each text area through OCR and may, in order to perform OCR, include a supervised learning-based machine learning model. The text selection module 122 may be driven through a CPU or a compute acceleration unit (e.g., a vector arithmetic unit or a general-purpose graphic arithmetic unit) of a computer and a memory (e.g., RAM).

In addition, the text selection module 122, because every image is delivered at a specific period (e.g., 1/15 second), may consistently perform mapping on each image with regard to checking whether a text block is the same text block and perform processing to maintain the result.

The text selection module 122 may generate text blocks that are text recognition results and select a text block closest to the gaze position information among the text blocks divided by regions. To this end, the text selection module 122 according to the embodiment of the present invention may perform a distance calculation according to a Euclidean space using a Cartesian coordinate system. In the calculation, the position information may not exactly match due to the nature of the pupil movement of a person. In this case, a text block that matches the most possible text among the given text blocks may be selected first.

Meanwhile, according to the embodiment of the present invention, the determining of a text block may use point information, such as pointing by a user's finger or a pen (hereinafter, point information).

In one embodiment, when the image segmentation and object recognition module 121 detects point information of a user that is different from the gaze position information directed to a position in the spatial domain, the text selection module 122 may select a block closest to the user's point information, although independent of the gaze position information, and determine the block. This is to first recognize a text block pointed at by a finger in case a precise gaze position is not distinguished due to a specific environmental factor.

When the gaze position information sporadically shakes without being fixed for a certain period of time, a message guiding that the point information of the user is to be used may be provided. An example of the speech feedback may include transmitting a message "The gaze position is not recognized. Point your finger at a desired position".

As another embodiment, when a plurality of pieces of point information of a user are detected in the spatial domain image, feedback information for enabling the user to use only one piece of point information among the plurality of pieces of point information may be provided. As an example, feedback information, such as "one or more fingers are being detected" may be provided.

When the point information of the user moves continuously for a predetermined time within the same text block, a text range pointed at by the point information may be selected and determined as one independent user-specified text block. The user-specified text block may have a number (e.g., 1-1) that is a lower-level number of the unique ID of the original text block to which the corresponding block belongs. For example, in a case in which a user reads a book in a foreign language, when the user moves his/her finger in the form of underlining a part that needs to be translated, the corresponding part in the corresponding text block may be selected as an independent user-specified text block. The text selection module 122, based on the text block being determined, converts the text block into a character string and then transmits the result to the machine translation module 123. The machine translation module 123 converts a first language included in the determined text block into a second language that is a target language.

As an embodiment, the machine translation module 123 is configured to perform translation by an ensemble of one or more of: a rule-based automatic translation (rule-based machine translation: RBMT) based on knowledge, such as a rule and vocabulary dictionary for conversion between the first language and the second language; statistic-based automatic translation (statistical machine translation: SMT) that has knowledge of lexical sequence pairs between the first language and the second language and the probabilities thereof; and a neural network-based automatic translation (neural machine translation: NMT) including an encoder neural network that abstracts an input composed of the first language and a decoder neural network that generates a lexical sequence of the second language on the basis of an abstract vector representation, to finally acquire a lexical sequence corresponding to the second language.

Thereafter, the interpretation result provider 130 converts the converted second language result into an audio signal, which is then provided to the user by a diaphragm constituting a speaker connected to an external device or an earphone. In this case, the interpretation result provider 130 may provide the second language result to the user in various forms through various devices, such as a display device, as well as a speaker.

The interpretation result provider 130 may include a visual feature representation generating module 131 and a speech synthesis module 132.

The visual feature representation generating module 131 receives output results of the image segmentation and object recognition module 121 and the text selection module 122.

In this case, the image segmentation and object recognition module 121 may generate relative position information of the individual object based on the text block that is a text recognition result in recognizing the individual object. As an example, eight pieces of relative position information (upper right, upper, upper left, right, left, lower right, lower, and lower left) may be recorded, and the relative position information may be provided to the visual feature representation generating module 131.

The visual feature representation generating module 131 receives relative position information of each object, classification information of each object, and information about the determined text block, and generates the relative position information of the individual object corresponding to the determined text block into text constructed in the first language or the second language.

As an example of implementing the above configuration, a neural network model having an encoder-decoder or a sequence-to-sequence (e.g., Bandanau et al., 2014) mechanism of the same concept as the encoder-decoder may be used.

The embodiment of the present invention does not generate text that describes the entire screen as in the image captioning seen in the related art but generates output text having an association with a specified text block, thereby exhibiting a difference from image-to-text conversion, such as conventional image captioning.

Finally, the speech synthesis module 132 converts the second language for the relative position information of the individual object corresponding to the determined text block and the determined text block into an audio signal and provides the second language to the user.

Such an embodiment of the present invention has the following differences compared to the related art.

First, according to the embodiment of the present invention, the text selection module 122 may receive the outputs of the image segmentation and object recognition module 121 and the gaze position information receiving module 112 as input and determine the position of the text block closest to a gaze position of the user and may convert the corresponding text into a second language and provide the second language to the user.

In addition, the text selection module 122 may be characterized by receiving the output result of the image segmentation and object recognition module 121 as input and acquire point information and may use the point information as an alternative to the gaze position information.

In addition, the embodiment of the present invention is characterized by including the visual feature representation generating module 131 configured to, in order to generate a translation result of a selected text block and feed the translation result back to the user, receive results of the text selection module 122 and the image segmentation and object recognition module 121 as input and output a relationship with an element adjacent to the selected text block and a visual feature as text.

FIGS. 2A to 2D are diagrams illustrating examples for each operation of providing an interpretation result according to the present invention.

Figure 2A:
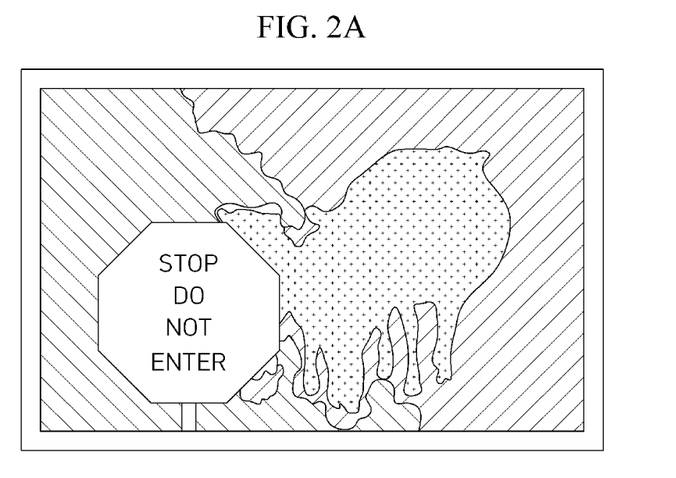
FIGS. 2A to 2D are diagrams illustrating examples for each operation of providing an interpretation result according to the present invention.
Figure 2B:
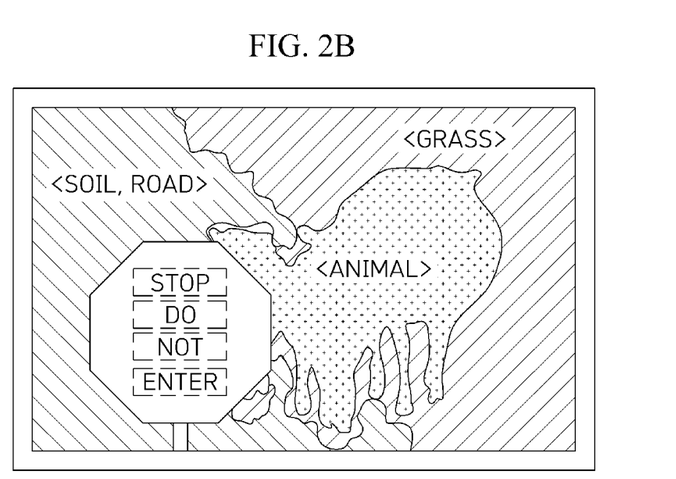

First, when the spatial domain image receiving module 111 receives a spatial domain image as shown in FIG. 2A, the image segmentation and object recognition module 121 segments the spatial domain image into a plurality of images and recognizes individual objects for each segmented image. In addition, the text selection module 122 generates text blocks that are text recognition results. In FIG. 2B, segmented images, information about individual objects, and text block generation results are illustrated. In this case, each rectangle indicated by a dotted line corresponds to each text block.

Figure 2C:
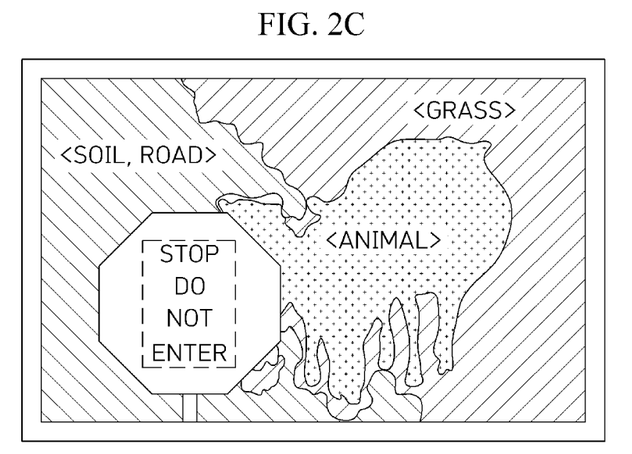

In FIG. 2C, an example in which text blocks are combined by the text selection module 122, in which text blocks "STOP", "DO", "NOT", and "ENTER" consecutively located within predetermined adjacent sections are combined into one text block "STOP DO NOT ENTER". A unique ID [1] is assigned to the text block combined as described above.

As another embodiment, in FIG. 2C, text blocks "STOP", "DO", "NOT", and "ENTER" consecutively located within predetermined adjacent sections are combined into two text blocks "STOP" and "DO NOT ENTER" according to the size of the characters constituting the text, and different unique IDs may be assigned to the two text blocks.

Figure 2D:
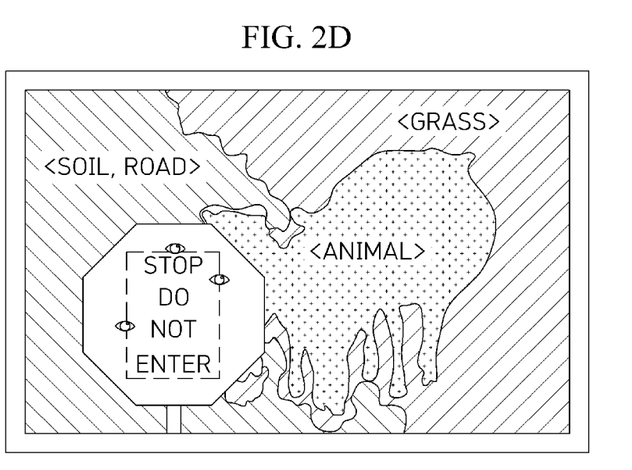

In FIG. 2D, an example in which gaze position information is combined is illustrated, and the shape of the pupil corresponds to the position in which the gaze is detected in the scene. In the example, a text block assigned a unique ID [1] is selected according to the gaze position information. When a plurality of text blocks are present, two or more text blocks may be selected according to the gaze position information. The text is translated by the machine translation module 123 as "정지 들어가지 마시오" when the native language of the user, that is, the second language, is Korean.

In addition, the translation result may be provided with relative position information indicating a position at which the text is located by the visual feature representation generating module 131. As an example, a translation result "The content recorded on the left side of the animal, at the bottom center of the road, says Stop. Do not enter." is generated.

Each result generated as described above is transmitted to the speech synthesis module 132, converted into an audio signal, and provided to the user through a speaker.

Figure 3:
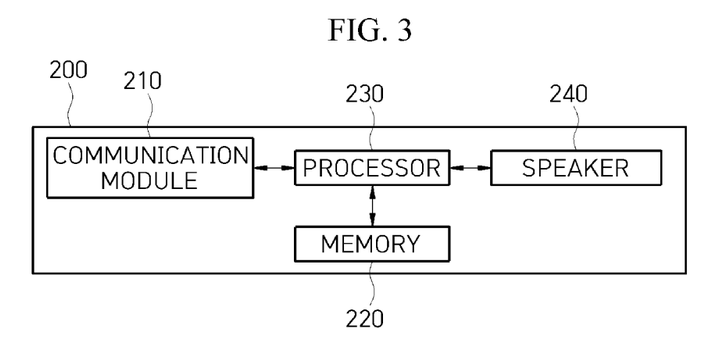
FIG. 3 is a diagram for describing a system for providing an interpretation result using visual information according to an embodiment of the present invention.

FIG. 3 is a diagram for describing a system 200 for providing an interpretation result using visual information according to an embodiment of the present invention.

In this case, the system 200 for providing an interpretation result described with reference to FIG. 3 may perform all functions performed by the apparatus 100 for providing an interpretation result shown in FIG. 1, and thus detailed descriptions thereof will be omitted.

The system 200 for providing an interpretation result according to the embodiment of the present invention includes a communication module 210, a memory 220, a processor 230, and a speaker 240.

The communication module 210 acquires, from an external device, a spatial domain image including line-of-sight information of a user and gaze position information in the spatial domain image.

In the memory 220, a program for recognizing text based on the spatial domain image and the gaze position information and providing an interpretation result for the recognized text is stored.

The processor 230, based on the program stored in the memory 220 being executed, segments the acquired spatial domain image into a plurality of images and detects a text area including text for each of the segmented images. Then, the processor 230 determines, among text blocks that are text recognition results for each detected text area, a text block corresponding to the gaze position information and converts a first language included in the determined text block into a second language, which is a target language.

The speaker 240 converts the converted second language result into an audio signal and provides the audio signal to the user.

Hereinafter, a method of providing an interpretation result using visual information according to an embodiment of the present invention will be described with reference to FIG. 4.

Figure 4:
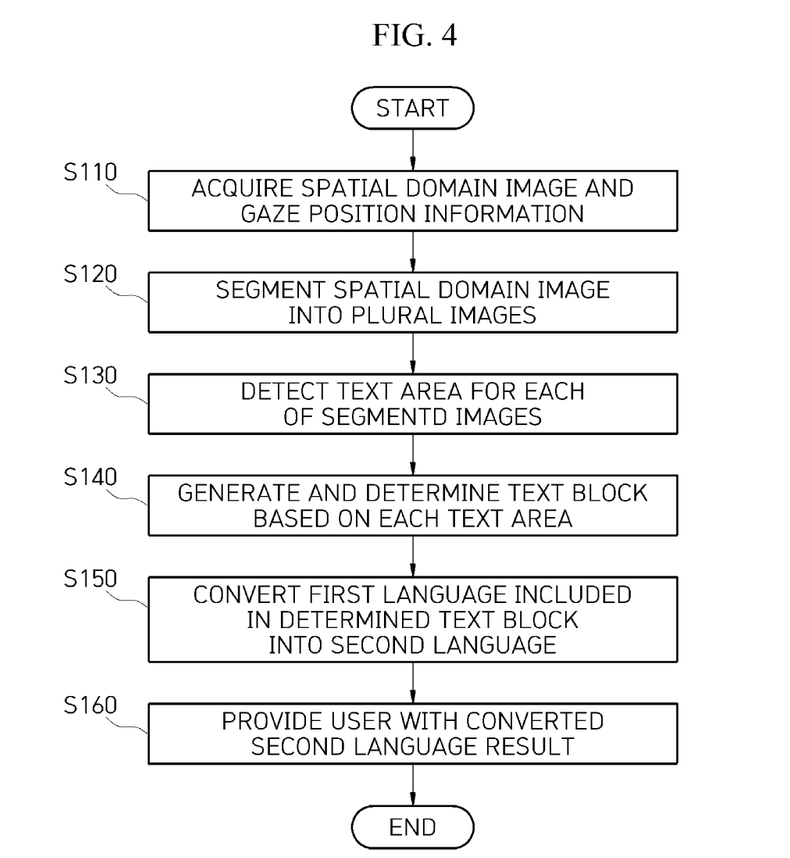
FIG. 4 is a flowchart showing a method of providing an interpretation result according to an embodiment of the present invention.

FIG. 4 is a flowchart showing a method of providing an interpretation result according to an embodiment of the present invention.

Meanwhile, each operation shown in FIG. 4 may be understood to be performed by the apparatus 100 for providing an interpretation result described in FIG. 1 or the system 200 for providing an interpretation result described in FIG. 3, but the present invention is not limited thereto.

First, a spatial domain image including line-of-sight information of a user and gaze position information in the spatial domain image are acquired (S110).

Next, the acquired spatial domain image is segmented into a plurality of images (S120), and a text area including text is detected for each of the segmented images (S130).

Next, text blocks, each of which is a result of text recognition for each detected text area, are generated, and a text block corresponding to the gaze position information is determined among the generated text blocks (S140).

Next, a first language included in the determined text block is converted into a second language that is a target language (S150), and the converted second language result is provided to the user (S160).

Meanwhile, in the above description, operations S110 to S160 may be further segmented into a larger number of operations or combined into a smaller number of operations according to examples of implementation of the present invention. In addition, some of the operations may be omitted or may be executed in the reverse order as needed. Parts omitted in the following description, which have been described above with reference to FIGS. 1 and 3, may be applied to the method of providing an interpretation result shown in FIG. 4.

The embodiment of the present invention described above may be implemented as a program (or an application) to be executed in combination with a server, which is hardware, and stored in a medium.

The program may include codes coded in a computer language, such as C, C++, Java, other machine language, etc., that can be read by a processor (e.g., a CPU) of a computer through a device interface of the computer in order for the computer to read the program and execute the methods implemented as the program. The code may include a functional code that is related to a function that defines functions needed to execute the methods and may include an execution procedure related control code needed to cause the processor of the computer to execute the functions according to a predetermined procedure. In addition, the code may further include a memory reference related code as to whether additional information or media needed to cause the processor of the computer to execute the functions should be referred to at a location (an address) of an internal or external memory of the computer. In addition, when the processor of the computer needs to communicate with any other computers or servers, etc. at a remote site, to perform the above-described functions, the code may further include communication related codes such as how to communicate with any other computers or servers at a remote site and what information or media should be transmitted or received during communication.

The storage medium does not refer to a medium that stores data for a short period of time, such as a register, cache, memory, etc., but refers to a medium that stores data semi-permanently and can be read by a device. Specifically, examples of the storage medium include may include a ROM, a RAM, a CD-ROM, a magnetic tape, a floppy disk, an optical data storage device, etc., but the storage medium is not limited thereto. That is, the program may be stored in various recording media on various servers which the computer can access or on various recording media on the computer of the user. In addition, the medium may be distributed over computer systems connected through a network so that computer-readable codes may be stored in a distributed manner.

The above description of the invention is for illustrative purposes, and a person having ordinary skills in the art should appreciate that other specific modifications can be easily made without departing from the technical spirit or essential features of the invention. Therefore, the above-described embodiments should be regarded as illustrative rather than limitative in all aspects. For example, components which have been described as being a single unit can be embodied in a distributed form, whereas components which have been described as being distributed can be embodied in a combined form.

As is apparent from the above, the method, apparatus, and system for providing an interpretation result using visual information according to the above-described embodiment of the present invention can recognize text on which a user focuses, from street signboards, tourist site descriptions, promotional brochures, etc., that the user sees while on the move during international travel, interpret the text into a native language speech of the user and provide the user with the interpreted text, thereby providing convenience of communication during international travel.

In particular, on signboards, promotional brochures, covers, etc., important content is emphasized using various design elements, such as the type and size of a font and the position of text together with several pictures, and the corresponding part naturally catches the eyes of a user and gains attention of the user. Accordingly, excluding a part not desired in. text recognition and interpretation and recognizing and interpreting only a part gaining attention of the user can help to grasp the environment and situation.

In addition, when a foreign language learner or a user encounters a word or expression that the user does not know when reading text in a foreign language, the foreign language learner or the user cannot need to look up the word or expression in a dictionary, but can merely focus on the text for a moment or can designate a region to be translated with a finger or pen (hereinafter abbreviated as a "finger"), to easily acquire a translation in a target language for the corresponding character string, thereby reducing inconvenience caused by appearance of an unknown foreign language expression.

In addition, considering that, in the visually-impaired, total blindness makes up about 5% of the population, which is a minority, people who have acquired blindness who have become accustomed to living with their eyes open is 90% or more of the population, and those who cannot read Braille is 90% or more, the method, apparatus, and system for providing an interpretation result using visual information can provide speech for text of an area on which a user focuses in daily life, or text of a brochure being read by a user so that convenience in life can be provided.

The effects of the present invention are not limited to those described above, and other effects not described above will be clearly understood by those skilled in the art from the above detailed description.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A method of providing an interpretation result using visual information, which is performed by an apparatus for providing an interpretation result using visual information, the method comprising:

acquiring a spatial domain image including line-of-sight information of a user and gaze position information in the spatial domain image;

segmenting the acquired spatial domain image into a plurality of images;

detecting text areas including text for each of the segmented images;

generating text blocks, each of which is a text recognition result for each of the detected text areas, and determining the text block corresponding to the gaze position information;

converting a first language included in the determined text block into a second language that is a target language; and providing the user with a conversion result of the second language, wherein the generating of the text blocks, each of which is the text recognition result for each of the detected text areas, and the determining of the text block corresponding to the gaze position information includes:
  combining text blocks consecutively located within predetermined sections adjacent to each other into one text block; and
  assigning a unique number to the text block or the combined text block, and wherein the generating of the text blocks, each of which is the text recognition result for each of the detected text areas, and the determining of the text block corresponding to the gaze position information includes
  recognizing the text block corresponding to the unique number assigned in previous visual information as the same text block for a certain period of time.

2. The method of claim 1, further comprising arranging the spatial domain image and the gaze position information corresponding to the spatial domain area based on time.

3. The method of chair 1, wherein the combining of the text blocks consecutively located within the predetermined sections adjacent to each other into one text block includes
  separating the text blocks having at least one of a different size and a different font and located in the same or adjacent text areas.

4. The method of claim 1, wherein the generating of the text blocks, each of which is the text recognition result for each of the detected text areas, and the determining of the text block corresponding to the gaze position information includes
  selecting the text block closest to the gaze position information among the generated text blocks and determining the text block.

5. The method of claim 1, wherein the generating of the text blocks, each of which is the text recognition result for each of the detected text areas, and the determining of the text block corresponding to the gaze position information includes,
  in response to point information of the user different from the gaze position information being present, selecting the text block closest to the point information of the user and determining the text block.

6. The method of claim 5, wherein the generating of the text blocks, each of which is the text recognition result for each of the detected text areas, and the determining of the text block corresponding to the gaze position information includes,
  in response to the point information of the user being detected in a plurality of pieces thereof, providing feedback information to use only one piece of point information among the plurality of pieces of point information.

7. The method of claim 5, wherein the generating of the text blocks, each of which is the text recognition result for each of the detected text areas, and the determining of the text block corresponding to the gaze position information includes,
  when the point information of the user continuously moves for a certain period of time within the same text block, selecting a text range pointed at by the point information as one independent user-specified text block and determining the text range.

8. The method of claim 1, wherein the generating of the text blocks, each of which is the text recognition result for each of the detected text areas, and the determining of the text block corresponding to the gaze position information includes,
  when the gaze position information sporadically shakes without being fixed for a certain period of time, providing a message guiding that the point information of the user is to be used.

9. The method of claim 1, wherein the segmenting of the acquired spatial domain image into the plurality of images includes:
  segmenting the acquired spatial domain image into the plurality of images on the basis of a pre-trained neural network algorithm;
  determining, for each of the segmented images, an individual object corresponding to one of previously-specified classes; and
  generating relative position information of the individual object based on the text block that is the text recognition result for the determined individual object.

10. The method of claim 9, wherein the converting of the first language included in the determined text block into the second language that is the target language includes converting the relative position information of the individual object corresponding to the determined text block into the second language, and
  wherein the providing of the converted second language to the user includes providing the user with the second language for the determined text block and the position information.

11. An apparatus for providing an interpretation result using visual information, the apparatus comprising:
  a visual information receiver configured to acquire a spatial domain image including line-of-sight information of a user and gaze position information in the spatial domain image;
  a visual information converter configured to segment the acquired spatial domain image into a plurality of images, detect text areas including text for each of the segmented images, determine, among text blocks, each of which is a text recognition result for each of the detected text areas, a text block corresponding to the gaze position information, and convert a first language included in the determined text block into a second language that is a target language; and
  an interpretation result provider configured to provide the user with a conversion result of the second language,
  wherein the visual information converter is configured to combine text blocks consecutively located within predetermined sections adjacent to each other into one text block and assign a unique number to the text block or the combined text block, and
  wherein the visual information converter is configured to recognize the text block corresponding to the unique number assigned in previous visual information as the same text block for a certain period of time.

12. The apparatus of claim 11, wherein the visual information converter is configured to select the text block closest to the gaze position information among the generated text blocks and determine the text block.

13. The apparatus of claim 11, wherein the visual information converter is configured to, in response to point information of the user different from the gaze position information being present, select the text block closest to the point information of the user and determining the text block.

14. The apparatus of claim 11, wherein the visual information converter is configured to segment the acquired spatial domain image into the plurality of images on the basis of a pre-trained neural network algorithm and determine, for each of the segmented images, an individual object corresponding to one of previously-specified classes, and wherein the interpretation result provider is configured to generate relative position information of the individual object based on the text block that is the text recognition result for the determined individual object.

15. The apparatus of claim 14, wherein the visual information converter is configured to convert the relative position information of the individual object corresponding to the determined text block into the second language, and wherein the interpretation result provider is configured to provide the user with the second language for the determined text block and the position information.

16. A system for providing an interpretation result using visual information, the system comprising:

a communicator configured to acquire a spatial domain image including line-of-sight information of a user and gaze position information in the spatial domain image from an external device;

a memory in which a program for recognizing text on the basis of the spatial domain image and the gaze position information and provide an interpretation result for the recognized text is stored;

a processor configured to execute the program stored in the memory to: segment the acquired spatial domain image into a plurality of images; detect text areas including text for each of the segmented images; determine, among text blocks, each of which is a text recognition result for each of the detected text areas, a text block corresponding to the gaze position information; and convert a first language included in the determined text block into a second language that is a target language; and a device configured to provide the user with a conversion result of the second language, wherein the processor is configured to combine text blocks consecutively located within predetermined sections adjacent to each other into one text block and assign a unique number to the text block or the combined text block, and wherein the processor is configured to recognize the text block corresponding to the unique number assigned in previous visual information as the same text block for a certain period of time.

\* \* \* \* \*